(12) United States Patent
Topliss et al.

(10) Patent No.: US 12,153,229 B2
(45) Date of Patent: Nov. 26, 2024

(54) ELECTRONIC DEVICES WITH ADJUSTABLE LENSES

(71) Applicant: Apple Inc., Cupertino, CA (US)

(72) Inventors: Richard J. Topliss, Cambridge (GB); Igor Stamenov, Manteca, CA (US); Ran He, San Jose, CA (US); Yuan Li, Cupertino, CA (US); Peng Lv, Cupertino, CA (US); James E. Pedder, Oxfordshire (GB)

(73) Assignee: Apple Inc., Cupertino, CA (US)

( * ) Notice: Subject to any disclaimer, the term of this patent is extended or adjusted under 35 U.S.C. 154(b) by 323 days.

(21) Appl. No.: 17/168,008

(22) Filed: Feb. 4, 2021

(65) Prior Publication Data

US 2021/0286108 A1 Sep. 16, 2021

Related U.S. Application Data

(60) Provisional application No. 62/988,865, filed on Mar. 12, 2020.

(51) Int. Cl.
*G02B 3/14* (2006.01)
*G02B 26/00* (2006.01)

(52) U.S. Cl.
CPC ............. *G02B 3/14* (2013.01); *G02B 26/004* (2013.01)

(58) Field of Classification Search
CPC .................................... G02B 3/12; G02B 3/14
See application file for complete search history.

(56) References Cited

U.S. PATENT DOCUMENTS

| 5,371,629 A | 12/1994 | Kurtin et al. |
| 5,526,067 A | 6/1996 | Cronin et al. |

(Continued)

FOREIGN PATENT DOCUMENTS

| CN | 109716215 A | 5/2019 |
| CN | 110398837 A | 11/2019 |

(Continued)

OTHER PUBLICATIONS

M. Blum et al., Compact optical design solutions using focus tunable lenses, Optical Design and Engineering IV, Sep. 21, 2011, vol. 8167, Society of Photo-Optical Instrumentation Engineers, Dietikon, Switzerland.

*Primary Examiner* — Christopher Stanford
(74) *Attorney, Agent, or Firm* — Treyz Law Group, P.C.; Kendall P. Woodruff (57) ABSTRACT

A head-mounted device may include one or more adjustable lens elements. The adjustable lens element may include a transparent substrate, a collapsible wall that forms an enclosed perimeter on the transparent substrate, and a flexible membrane on the collapsible wall that together define an interior volume. The interior volume may be filled with a fluid. The adjustable lens element may include a lens shaping component that applies a force to the collapsible wall to adjust a height of the collapsible wall relative to the transparent substrate, which in turn may be used to adjust the shape of the flexible membrane and thus the lens power of the lens element. The collapsible wall may have bellows that allow the collapsible wall to fold on itself when compressed, thereby minimizing unintended lateral movement of the collapsible wall.

20 Claims, 5 Drawing Sheets

(56) References Cited

U.S. PATENT DOCUMENTS

| | | | | |
|---|---|---|---|---|
| 5,665,275 A * | 9/1997 | Kobayashi | ............... | G02B 1/04 |
| | | | | 359/290 |
| 5,956,183 A | 9/1999 | Epstein et al. | | |
| 7,453,646 B2 | 11/2008 | Lo | | |
| 7,866,816 B2 * | 1/2011 | Kurtin | ................ | G02C 7/086 |
| | | | | 351/159.46 |
| 8,018,658 B2 | 9/2011 | Lo | | |
| 8,064,142 B2 * | 11/2011 | Batchko | ................ | G02B 5/20 |
| | | | | 359/666 |
| 8,137,315 B2 * | 3/2012 | Boey | ................ | F04B 23/02 |
| | | | | 604/890.1 |
| 8,708,487 B2 * | 4/2014 | Kurtin | ................ | G02C 5/001 |
| | | | | 359/666 |
| 9,158,130 B2 | 10/2015 | Wehrenberg | | |
| 9,874,664 B2 * | 1/2018 | Stevens | ................ | G02C 7/083 |
| 10,004,596 B2 | 6/2018 | Brady et al. | | |
| 10,928,558 B1 * | 2/2021 | Cooke | ................ | G02B 26/06 |
| 11,086,132 B2 * | 8/2021 | Stevens | ............... | G02B 27/0172 |
| 11,209,649 B1 * | 12/2021 | Smyth | ................ | C30B 29/32 |
| 2008/0084532 A1 | 4/2008 | Kurtin | | |
| 2010/0079873 A1 | 4/2010 | Wang et al. | | |
| 2010/0208357 A1 | 8/2010 | Batchko et al. | | |
| 2020/0285077 A1 | 9/2020 | Leuenberger et al. | | |
| 2020/0341172 A1 * | 10/2020 | Stevens | ............... | G02B 27/0081 |
| 2021/0011204 A1 | 1/2021 | Mastrangelo et al. | | |

FOREIGN PATENT DOCUMENTS

| | | |
|---|---|---|
| CN | 209821509 U | 12/2019 |
| EP | 2860555 A1 | 4/2015 |
| WO | 9527912 A1 | 10/1995 |
| WO | 2013143630 A1 | 10/2013 |
| WO | 2013144533 A1 | 10/2013 |
| WO | 2013144592 A1 | 10/2013 |
| WO | 2018028847 A1 | 2/2018 |
| WO | 2019186183 A1 | 10/2019 |

* cited by examiner

ELECTRONIC DEVICES WITH ADJUSTABLE LENSES

This application claims the benefit of U.S. provisional patent application No. 62/988,865, filed Mar. 12, 2020, which is hereby incorporated by reference herein in its entirety.

BACKGROUND

This relates generally to electronic devices and, more particularly, to wearable electronic device systems.

Electronic devices are sometimes configured to be worn by users. For example, head-mounted devices are provided with head-mounted structures that allow the devices to be worn on a user's head. The head-mounted devices may include optical systems with lenses. The lenses allow displays in the devices to present visual content to users.

Head-mounted devices typically include lenses with fixed shapes and properties. If care is not taken, it may be difficult to adjust these types of lenses to optimally present content to each user of the head-mounted device.

SUMMARY

A head-mounted device may have a display that displays content for a user. Head-mounted support structures in the device support the display on the head of the user.

The head-mounted device may have respective left and right lens modules and respective left and right portions of a display. The left lens module may direct images from the left portion of the display to a left eye box whereas the right lens module may direct images from the right portion of the display to a right eye box.

A lens module in the head-mounted device may include one or more adjustable lens elements. An adjustable lens element may include a transparent substrate, a collapsible wall that forms an enclosed perimeter on the transparent substrate, and a flexible membrane on the collapsible wall that together define an interior volume. The interior volume may be filled with a fluid. The adjustable lens element may include a lens shaping component that applies a force to the collapsible wall to adjust a height of the collapsible wall relative to the transparent substrate, which in turn may be used to adjust the shape of the flexible membrane and the lens power of the lens element. The collapsible wall may have bellows that allow the collapsible wall to fold on itself when compressed, thereby minimizing unintended lateral movement of the collapsible wall. The collapsible wall may include one or more reinforced portions (e.g., with embedded reinforcement structures and/or where portions of the wall are locally thickened or otherwise modified to be stiffer). If desired, the reinforced portions of the wall may be laterally offset from one another to avoid colliding with one another when the wall is compressed.

Control circuitry in the head-mounted device may control the actuators in the lens shaping component to dynamically adjust the lens power of the adjustable lens element. The lens shaping component may have non-uniform construction (e.g., non-uniform modulus of elasticity). One or more sensors and/or coatings may be used to detect leaks in the adjustable lens element.

DETAILED DESCRIPTION

Electronic devices may include displays and other components for presenting content to users. The electronic devices may be wearable electronic devices. A wearable electronic device such as a head-mounted device may have head-mounted support structures that allow the head-mounted device to be worn on a user's head.

A head-mounted device may contain a display formed from one or more display panels (displays) for displaying visual content to a user. A lens system may be used to allow the user to focus on the display and view the visual content. The lens system may have a left lens module that is aligned with a user's left eye and a right lens module that is aligned with a user's right eye.

The lens modules in the head-mounted device may include lenses that are adjustable. For example, fluid-filled adjustable lenses may be used to adjust the display content for specific viewers.

Figure 1:
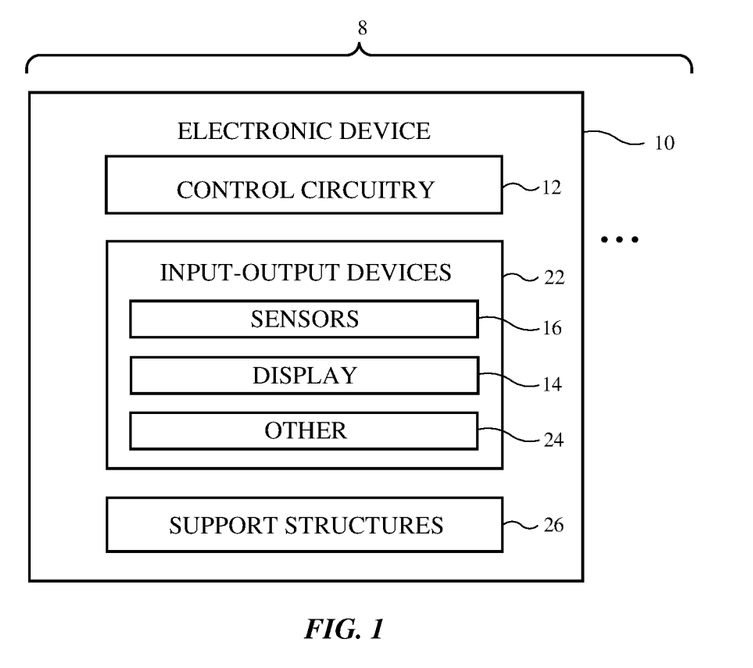
FIG. 1 is a schematic diagram of an illustrative electronic device such as a head-mounted display device in accordance with an embodiment.

A schematic diagram of an illustrative system having an electronic device with a lens module is shown in FIG. 1. As shown in FIG. 1, system 8 may include one or more electronic devices such as electronic device 10. The electronic devices of system 8 may include computers, cellular telephones, head-mounted devices, wristwatch devices, and other electronic devices. Configurations in which electronic device 10 is a head-mounted device are sometimes described herein as an example.

As shown in FIG. 1, electronic devices such as electronic device 10 may have control circuitry 12. Control circuitry 12 may include storage and processing circuitry for controlling the operation of device 10. Circuitry 12 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 12 may be based on one or more microprocessors, microcontrollers, digital signal processors, baseband processors, power management units, audio chips, graphics processing units, application specific integrated circuits, and other integrated circuits. Software code may be stored on storage in circuitry 12 and run on processing circuitry in circuitry 12 to implement control operations for device 10 (e.g., data gathering operations, operations involved in processing three-dimensional facial image data, operations involving the adjustment of components using control signals, etc.). Control circuitry 12 may include wired and wireless communications circuitry. For example, control circuitry 12 may include radio-frequency transceiver circuitry such as cellular telephone transceiver circuitry, wireless local area network (WiFi®) transceiver circuitry, millimeter wave transceiver circuitry, and/or other wireless communications circuitry.

During operation, the communications circuitry of the devices in system 8 (e.g., the communications circuitry of control circuitry 12 of device 10), may be used to support communication between the electronic devices. For example, one electronic device may transmit video and/or audio data to another electronic device in system 8. Electronic devices in system 8 may use wired and/or wireless communications circuitry to communicate through one or more communications networks (e.g., the internet, local area networks, etc.). The communications circuitry may be used to allow data to be received by device 10 from external equipment (e.g., a tethered computer, a portable device such as a handheld device or laptop computer, online computing equipment such as a remote server or other remote computing equipment, or other electrical equipment) and/or to provide data to external equipment.

Device 10 may include input-output devices 22. Input-output devices 22 may be used to allow a user to provide device 10 with user input. Input-output devices 22 may also be used to gather information on the environment in which device 10 is operating. Output components in devices 22 may allow device 10 to provide a user with output and may be used to communicate with external electrical equipment.

As shown in FIG. 1, input-output devices 22 may include one or more displays such as display 14. In some configurations, display 14 of device 10 includes left and right display panels (sometimes referred to as left and right portions of display 14 and/or left and right displays) that are in alignment with the user's left and right eyes, respectively. In other configurations, display 14 includes a single display panel that extends across both eyes.

Display 14 (sometimes referred to as pixel array 14) may be used to display images. The visual content that is displayed on display 14 may be viewed by a user of device 10. Displays in device 10 such as display 14 may be organic light-emitting diode displays or other displays based on arrays of light-emitting diodes, liquid crystal displays, liquid-crystal-on-silicon displays, projectors or displays based on projecting light beams on a surface directly or indirectly through specialized optics (e.g., digital micromirror devices), electrophoretic displays, plasma displays, electrowetting displays, or any other suitable displays.

Display 14 may present display content for a computer-generated reality such as virtual reality content or mixed reality content.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Configurations in which display 14 is used to display virtual reality content to a user through lenses are described herein as an example.

Input-output circuitry 22 may include sensors 16. Sensors 16 may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible digital image sensors), gaze tracking sensors (e.g., a gaze tracking system based on an image sensor and, if desired, a light source that emits one or more beams of light that are tracked using the image sensor after reflecting from a user's eyes), touch sensors, buttons, force sensors, sensors such as contact sensors based on switches, gas sensors, pressure sensors, moisture sensors, magnetic sensors, audio sensors (microphones), ambient light sensors, microphones for gathering voice commands and other audio input, sensors that are configured to gather information on motion, position, and/or orientation (e.g., accelerometers, gyroscopes, compasses, and/or inertial measurement units that include all of these sensors or a subset of one or two of these sensors), fingerprint sensors and other biometric sensors, optical position sensors (optical encoders), and/or other position sensors such as linear position sensors, and/or other sensors. Sensors 16 may include proximity sensors (e.g., capacitive proximity sensors, light-based (optical) proximity sensors, ultrasonic proximity sensors, and/or other proximity sensors). Proximity sensors may, for example, be used to sense relative positions between a user's nose and lens modules in device 10.

User input and other information may be gathered using sensors and other input devices in input-output devices 22. If desired, input-output devices 22 may include other devices 24 such as haptic output devices (e.g., vibrating components), light-emitting diodes and other light sources, speakers such as ear speakers for producing audio output, and other electrical components. Device 10 may include circuits for receiving wireless power, circuits for transmitting power wirelessly to other devices, batteries and other energy storage devices (e.g., capacitors), joysticks, buttons, and/or other components.

Electronic device 10 may have housing structures (e.g., housing walls, straps, etc.), as shown by illustrative support structures 26 of FIG. 1. In configurations in which electronic device 10 is a head-mounted device (e.g., a pair of glasses, goggles, a helmet, a hat, etc.), support structures 26 may include head-mounted support structures (e.g., a helmet housing, head straps, temples in a pair of eyeglasses, goggle housing structures, and/or other head-mounted structures). The head-mounted support structures may be configured to be worn on a head of a user during operation of device 10 and may support display(s) 14, sensors 16, other components 24, other input-output devices 22, and control circuitry 12.

In configurations in which electronic device 10 is a head-mounted device, support structures 26 may include, for example, structures that form housing walls and other structures for a main housing unit (e.g., exterior housing walls, lens module structures, other support structures for housing electronic components such as left and right display modules, etc.) and straps or other supplemental support structures that help to hold the main housing unit on a user's face so that the user's eyes are located within eye boxes.

Figure 2:
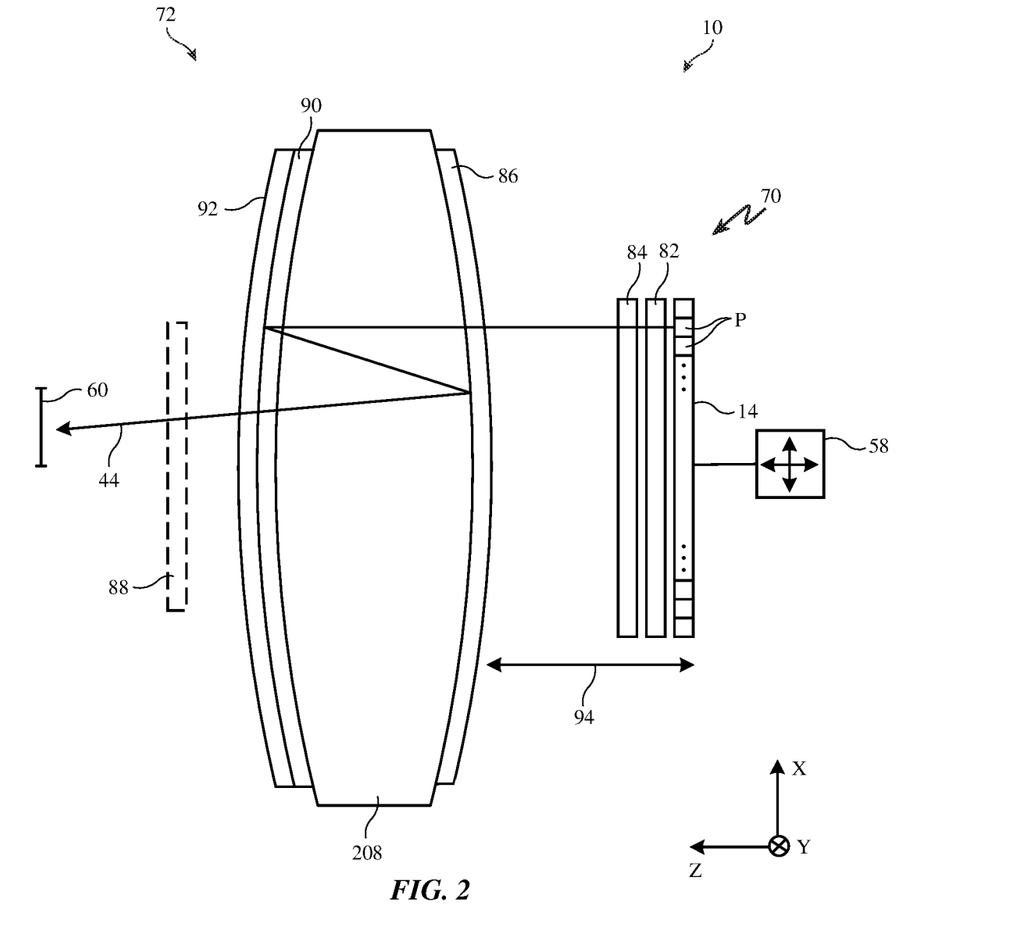
FIG. 2 is a cross-sectional side view an illustrative head-mounted device with a lens module that receives light from a display portion in accordance with an embodiment.

Display 14 may include left and right display panels (e.g., left and right pixel arrays, sometimes referred to as left and right displays or left and right display portions) that are mounted respectively in left and right display modules. FIG. 2 is a cross-sectional side view of an illustrative display module 70 that may be used as a left display module 70 and/or a right display module 70 in device 10. A left display module 70 may correspond to a user's left eye (and left eye box 60) and a right display module 70 may correspond to a user's right eye (and right eye box 60).

Each display module 70 includes a display portion 14 and a corresponding lens module 72 (sometimes referred to as lens stack-up 72 or lens 72). Lenses 72 may include one or more lens elements arranged along a common axis. Each lens element may have any desired shape and may be formed from any desired material (e.g., with any desired refractive index). The lens elements may have unique shapes and refractive indices that, in combination, focus light from display 14 in a desired manner. Each lens element of lens module 72 may be formed from any desired transparent material (e.g., glass, a polymer material such as polycarbonate or acrylic, a crystal such as sapphire, a combination of rigid and flexible materials, fluids, etc.).

The left and right display modules 70 in device 10 may optionally be individually positioned relative to the user's eyes and relative to some of the housing wall structures of a main housing unit using positioning circuitry such as respective left and right positioners 58. Positioners 58 may be stepper motors, piezoelectric actuators, motors, linear electromagnetic actuators, and/or other electronic components for adjusting the position of displays 14 and lens modules 72. Positioners 58 may be controlled by control circuitry 12 during operation of device 10. For example, positioners 58 may be used to adjust the spacing between left and right display modules 70 (and therefore the lens-to-lens spacing between the left and right lenses of modules 70) to match the interpupillary distance of a user's eyes. If desired, positioners 58 may also be used to adjust distance 94 between lens module 72 and display 14 (e.g., to account for users with different eyesight).

As shown in FIG. 2, display module 70 in head-mounted device 10 may include a source of images such as pixel array 14 (sometimes referred to as display 14). Pixel array 14 may include a two-dimensional array of pixels P that emits image light. Pixels P in pixel array 14 may include organic light-emitting diode pixels, light-emitting diode pixels formed from semiconductor dies, liquid crystal display pixels with a backlight, liquid-crystal-on-silicon pixels with a frontlight, and/or any other suitable type of pixels.

If desired, display module 70 may include a catadioptric optical system. A polarizer such as linear polarizer 82 may be placed in front of pixel array 14 and/or may be laminated to pixel array 14 to provide polarized image light. Linear polarizer 82 may have a pass axis aligned with the X-axis of FIG. 2 (as an example). A quarter wave plate 84 may also be provided on display 14. The quarter wave plate may provide circularly polarized image light. The fast axis of quarter wave plate 84 may be aligned at 45 degrees to the pass axis of linear polarizer 82. Quarter wave plate 84 may be mounted in front of polarizer 82 (between polarizer 82 and lens module 72). If desired, quarter wave plate 84 may be attached to polarizer 82 (and display 14).

Lens module 72 may include one or more lens elements such as lens element 208. The arrangement of FIG. 2 in which lens element 208 has a convex surface facing display 14 and a convex surface facing eye box 60 is merely illustrative. If desired, lens element 208 may have surfaces with other shapes (e.g., planar, convex, concave, etc.). In some arrangements, lens element 208 may be a rigid lens element formed from glass, a polymer material such as polycarbonate or acrylic, a crystal such as sapphire, etc. In other arrangements, lens element 208 may be a flexible lens element that can be adjusted to have different shapes (e.g., lens element 208 may have surfaces that can change between convex shapes, concave shapes, planar shapes, etc.).

Optical structures such as partially reflective coatings, wave plates, reflective polarizers, linear polarizers, antireflection coatings, and/or other optical components may be incorporated into head-mounted device 10. These optical structures may allow light rays from display 14 to pass through and/or reflect from surfaces in lens element 208, thereby providing lens module 72 with a desired lens power.

For example, a partially reflective mirror (e.g., a metal mirror coating or other mirror coating such as a dielectric multilayer coating with a 50% transmission and a 50% reflection) such as partially reflective mirror 86 may be formed on lens element 208 (e.g., between the lens element and display 14). Quarter wave plate 90 and reflective polarizer 92 may be formed on the opposing surface of lens element 208 (e.g., between lens element 208 and eye box 60). Light such as light 44 may pass through the lens. The example of FIG. 2 in which a catadioptric lens is used in lens module 72 is merely illustrative. In general, lens module 72 may include any desired combination of optical structures (e.g., partially reflective coatings, wave plates, reflective polarizers, linear polarizers, antireflection coatings, etc.) at any desired location within the lens module. Additional lens elements may be incorporated into lens module 72 and each lens element may have any desired shape.

If desired, head-mounted device 10 may include positioner 58 for adjusting the distance 94 between lens module 72 (e.g., lens element 208) and display 14. Positioner 58 may include one or more stepper motors, piezoelectric actuators, motors, linear electromagnetic actuators, and/or other electronic components for adjusting the position of pixel array 14 (and/or adjusting the position of lens module 72). Positioner 58 may be controlled by control circuitry 12 (FIG. 1)

during operation of device 10 to adjust the position of pixel array 14 relative to lens module 72.

It may be desirable to be able to adjust the lens power of lens module 72 to accommodate users with different vision. For example, some users may have myopia (nearsightedness) whereas other users may have hyperopia (farsightedness). Additionally, the vision of a user's left eye may be different from the vision of the user's right eye. In addition to or instead of adjusting the position of pixel array 14 relative to lens module 72, each lens module 72 may include one or more adjustable lens elements such as adjustable lens element 88 having a tunable (adjustable) lens power. Adjustable lens element 88 may be located between eye box 60 and lens 208, may be located between lens 208 and pixel array 14, and/or may be located in other suitable locations. Control circuitry 12 may, if desired, independently control the lens power of each adjustable lens element to accommodate users with different vision and/or to accommodate left and right eyes with different vision.

Figure 3:
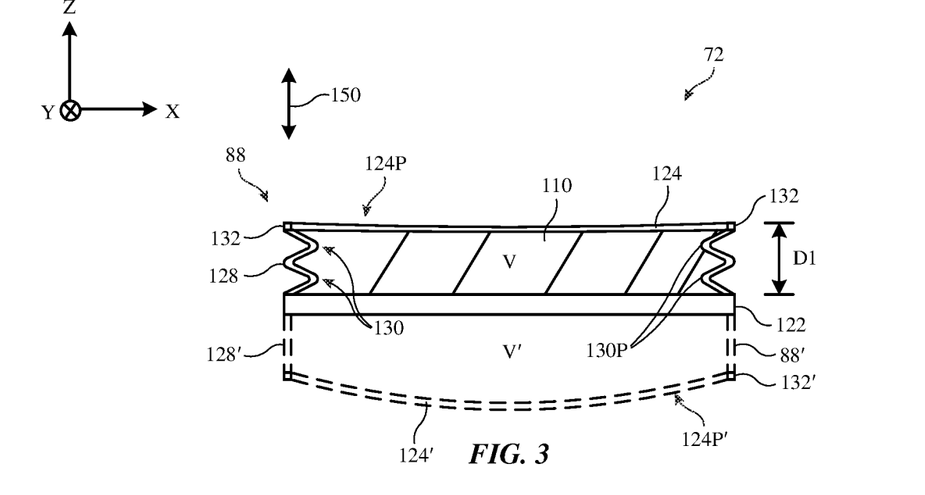
FIG. 3 is a cross-sectional side view of an illustrative adjustable lens element having a flexible membrane supported by a collapsible sidewall with bellows in accordance with an embodiment.

FIG. 3 is a cross-sectional side view of an illustrative lens module in device 10 having one or more adjustable lens elements. As shown in FIG. 3, adjustable lens element 88 may include substrate 122. Substrate 122 may be formed from a rigid, transparent material such as glass, polymer such as polycarbonate or acrylic, a crystal such as sapphire, or other suitable material. A flexible sidewall such as flexible wall 128 (e.g., a material having a relatively low modulus of elasticity such as polyurethane or other polymer that is molded, cast, or otherwise formed into the desired shape) may form an enclosed perimeter on substrate 122. The lateral footprint (e.g., in the X-Y plane of FIG. 3) of flexible wall 128 on substrate 122 may be circular, oval, elliptical, rectangular, or any other suitable shape. Arrangements in which flexible wall 128 follows a meandering path or any other arbitrary path along its perimeter may also be used. A flexible membrane such as flexible membrane 124 (e.g., a thin sheet of elastomeric material or other suitable flexible material) may be attached on top of flexible wall 128 and may cover the area on substrate 122 that is enclosed by flexible wall 128.

Substrate 122, flexible wall 128, and flexible membrane 124 may together define an interior volume V. The interior volume V may be partially or completely filled with a fluid such as fluid 110. Fluid 110 may be a liquid, gel, or gas with a predetermined index of refraction. Fluid 110 may sometimes be referred to as an index-matching oil, an optical oil, an optical fluid, an index-matching material, an index-matching liquid, etc. The amount of fluid 110 in volume V may be fixed, or the amount of fluid 110 in volume V may be adjusted during operation of device 10, if desired.

Figure 4:
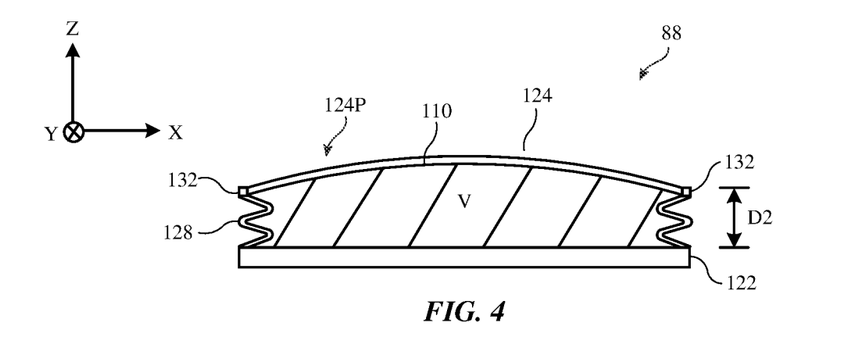
FIG. 4 is a cross-sectional side view of the adjustable lens element of FIG. 3 in a compressed state in accordance with an embodiment.

The lens power of lens element 88 may be adjusted using lens shaping component 132. In particular, lens shaping component 132 may include one or more actuators (e.g., one or more stepper motors, piezoelectric actuators, motors, linear electromagnetic actuators, and/or other electronic components that apply a force) that are used to adjust the height of flexible wall 128 in response to control signals from control circuitry 12 (e.g., by pushing and pulling flexible wall 128 in directions 150 and/or by leaving flexible wall 128 in a relaxed state in which lens shaping component 132 applies no forces to flexible wall 128). Adjusting the height of flexible wall 128 relative to substrate 122 may adjust the shape of flexible membrane 124, which in turn changes the lens power of lens element 88. For example, when flexible wall 128 is distance D1 from substrate 122, outer surface 124P of membrane 124 may have a concave shape (thus providing lens element 88 with a negative lens power), whereas when flexible wall 128 is compressed to distance D2 from substrate 122 (e.g., a distance less than D1), outer surface 124P may have a convex shape (thus providing lens element 88 with a positive lens power), as shown in FIG. 4. In general, wall 128 may be adjusted in any suitable fashion to achieve any desired shape in membrane 124. The examples of FIGS. 3 and 4 are merely illustrative.

If desired, an additional adjustable lens element such as lens element 88' may optionally be stacked with lens element 88. The additional lens element 88' may include similar or identical components as lens element 88, such as flexible wall 128', lens shaping component 132', and flexible membrane 124'. Additional lens element 88' may share substrate 122 with lens element 88 or may have its own separate substrate, if desired. Lens element 88' may be oriented in the opposite direction as lens element 88 such that its adjustable surface 124P' (e.g., the outer surface of flexible membrane 124') faces the opposite direction as adjustable surface 124P. The adjustable surface of one lens element (e.g., surface 124P or surface 124P') may face pixel array 14, and the adjustable surface of the opposite lens element (e.g., surface 124P' or surface 124P) may face eye box 60 (FIG. 2). In this way, control circuitry 12 may control the lens power of lens module 72 by providing appropriate control signals to lens shaping element 132 and lens shaping element 132'. If desired, control circuitry 12 may independently control lens elements 88 and 88' so that surfaces 124P and 124P' can have different shapes and/or so that lens elements 88 and 88' have different lens powers. Arrangements in which surfaces 124P and 124P' have the same shape and/or in which lens elements 88 and 88' have the same lens power may also be used.

The use of two adjustable lens elements 88 in module 72 is merely illustrative. If desired, there may only be a single lens element 88 in lens module 72, or there may be two, three, four, or more than four stacked lens elements 88 in lens module 72. For explanation purposes, the features of a single lens element 88 may be described herein, but it should be understood that similar features may be used in any or all of the additional lens elements 88 in device 10.

It may be desirable to ensure that flexible wall 128 is displaced only or mostly along the Z-direction when lens shaping component 132 presses or pulls in directions 150. For example, there may be additional components located laterally adjacent to lens element 88. If care is not taken, flexible wall 128 may bulge outward when pressed toward substrate 122. Excessive lateral movement of flexible wall 128 (e.g., movement in the X-Y plane of FIG. 3), may cause flexible wall 128 to collide with the other components that are adjacent to lens element 88.

To minimize lateral movement of flexible wall 128 in the X-Y plane, flexible wall 128 may have one or more accordion-like folds or pleats such as bellows 130. Bellows 130 (sometimes referred to as folds, pleats, zig-zags, curves, ridges, etc.) may allow wall 128 to be pushed and pulled in directions 150 while minimizing lateral movement in the X-Y plane. For example, as shown in the compressed state of FIG. 4, bellows 130 allow wall 128 to collapse and fold on itself when pressed toward substrate 122 by lens shaping component 132, with no outward bulging that could cause collisions with adjacent components. When wall 128 includes one or more bellows, pleats, or folds, wall 128 may sometimes be referred to as a foldable sidewall, a collapsible sidewall, a pleated sidewall, a zig-zag sidewall, etc.

In the example of FIGS. 3 and 4, the curved surfaces of bellows 130 such as curved surfaces 130P face towards interior volume V, which may help further reduce outward bulging of wall 128. This is merely illustrative, however. If desired, curved surfaces 130P of bellows 130 may face the opposite direction (e.g., may face away from interior volume V). Additionally, the use of two bellows 130 (e.g., with two curved surfaces 130P that sweep around the perimeter of lens 88) is merely illustrative. In general, flexible wall 128 may have any suitable number of bellows (e.g., three bellows, four bellows, five bellows, more than five bellows, less than five bellows, etc.).

If desired, the height of flexible wall 128 relative to substrate 122 may vary across the perimeter of flexible wall 128. For example, the height of flexible wall 128 relative to substrate 122 may be uniform across its perimeter when flexible wall 128 is in a relaxed state, but may be adjusted locally by applying appropriate forces to portions of wall 128 using lens shaping component 132. Arrangements where the height of flexible wall 128 relative to substrate 122 is non-uniform across its perimeter when flexible wall 128 is in a relaxed state may also be used. In general, the shape, size, construction, material, and/or any other suitable property of wall 128 may be varied to achieve the desired structure for lens 88.

Outward bulging and/or non-uniform bulging may also be minimized by incorporating one or more reinforcement or stiffening structures into flexible wall 128. This type of arrangement is illustrated in FIG. 5.

Figure 5:
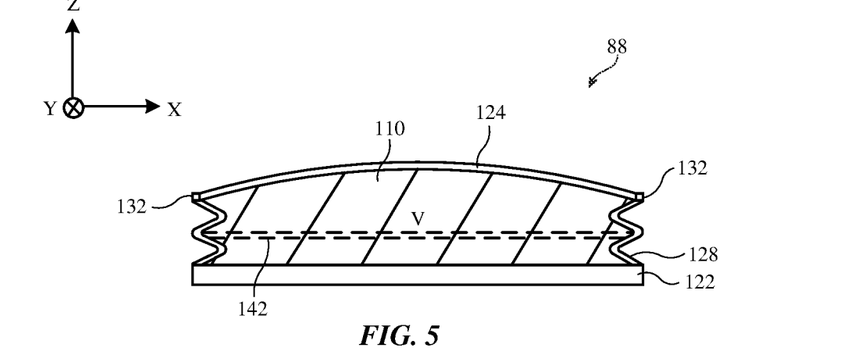
FIG. 5 is a cross-sectional side view of an illustrative adjustable lens element having a flexible membrane supported by a collapsible sidewall with reinforcement structures in accordance with an embodiment.

As shown in FIG. 5, flexible wall 128 may incorporate one or more reinforcement rings 142. Reinforcement rings 142 may be partially or entirely embedded in flexible wall 128, may be attached to an outer or inner surface of flexible wall 128, and/or may be formed from a locally thickened portion or otherwise locally modified portion of wall 128. Reinforcement ring 142 may form a continuous loop around the perimeter of interior volume V, or reinforcement ring 142 may be broken up into segments or sections that each extend only partly around the perimeter of interior volume V. Reinforcement rings may be formed form metal, polymer, or other suitable material and may, if desired, have a higher modulus of elasticity than the material that forms wall 128.

Figure 6:
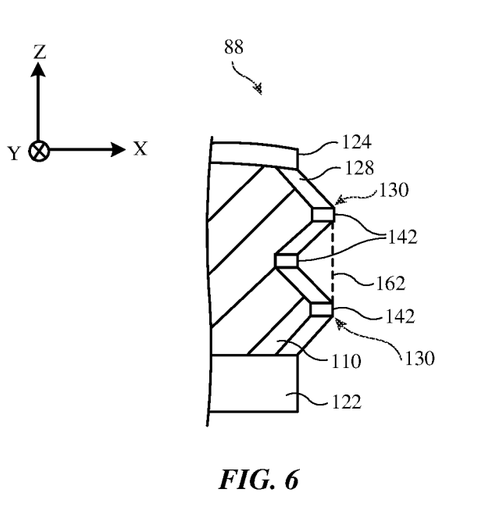
FIG. 6 is a cross-sectional side view of a portion of an illustrative adjustable lens element with reinforcement structures that are aligned with one another in accordance with an embodiment.
Figure 7:
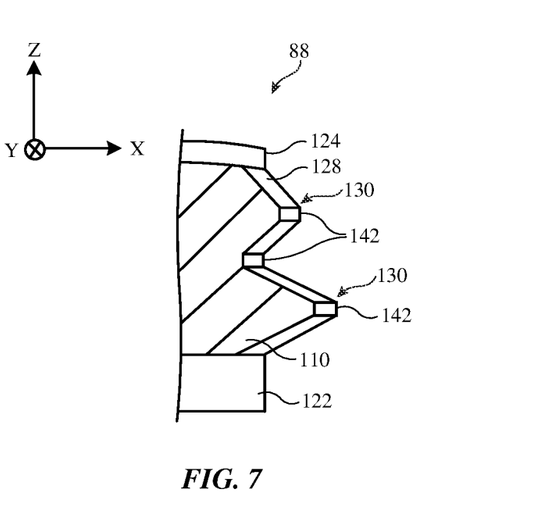
FIG. 7 is a cross-sectional side view of a portion of an illustrative adjustable lens element with reinforcement structures that are offset with respect to one another in accordance with an embodiment.

FIGS. 6 and 7 show illustrative locations for reinforcement rings 142. In both examples, reinforcement rings 142 are located at the corners of bellows 130 (e.g., the local peaks or troughs along wall 128). This is merely illustrative. If desired, reinforcement rings 142 may be incorporated into other locations of wall 128 such as regions between peaks and troughs.

In the example FIG. 6, some of reinforcement rings 142 are vertically aligned with one another along the Z-dimension of FIG. 6. When wall 128 is compressed, the aligned reinforcement rings 142 may travel towards one another (e.g., along line 162) and may, if desired, come into contact with one another during compression. This may, for example, be used in arrangements where it is desired to limit the maximum compression of lens element 88.

In the example if FIG. 7, reinforcement rings 142 are staggered so that rings 142 are laterally offset from one another. In this way, reinforcement rings 142 may not collide with one another when wall 128 is compressed, which may in turn allow for greater compression of lens element 88 than in an aligned ring arrangement of the type shown in FIG. 6. To achieve the offset configuration of FIG. 7, bellows 130 and/or rings 142 may have different perimeter lengths (e.g., may have different circumferences or perimeters so that some ridges of wall 128 are located further outward than other ridges).

If desired, lens element 88 may incorporate more than one sidewall structure to help contain fluid 110 in the event of a leak. This type of arrangement is illustrated in FIG. 8.

Figure 8:
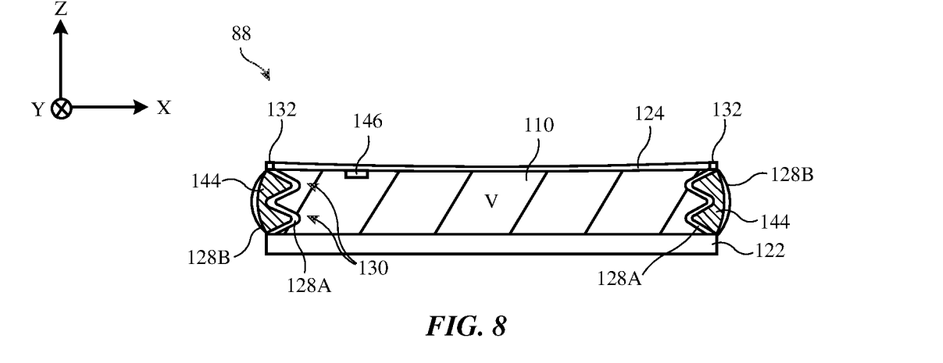
FIG. 8 is a cross-sectional side view of an illustrative adjustable lens element having inner and outer sidewalls and having leakage detection components in accordance with an embodiment.

As shown in FIG. 8, lens element 88 may include inner wall 128A and outer wall 128B. Inner wall 128A may include one or more bellows 130 to minimize lateral bulging of inner wall 128A. Outer wall 128B, which may be formed from the same or different materials as inner wall 128A, may have be curved, may be straight, may have one or more folds, pleats, or bellows, may have one or more concave surfaces facing inner wall 128A, may have one or more convex surfaces facing inner wall 128A, and/or may have any other suitable shape. Outer wall 128B may form a seal around inner wall 128A. In the event that inner wall 128A becomes compromised, any liquid 110 that leaks out of inner wall 128A will be contained within outer wall 128B. The volume between inner wall 128A and outer wall 128B may be sealed, if desired, and may be partially or completely filled with air, pressurized gas, dye, liquid, or other fluid such as fluid 144.

In addition to containing liquid in the event of a leak, outer wall 128B may be used to help detect when a leak has occurred. For example, fluid 144 between inner wall 128A and outer wall 128B may be a gas, a pressurized gas, or a liquid that is initially trapped between inner wall 128A and outer wall 128B. If inner wall 128A becomes compromised, bubbles or other artifacts may appear in fluid 110. The appearance of bubbles in fluid 110 may indicate that a leak has occurred and that lens element 88 may need to be repaired or replaced.

In another illustrative arrangement, fluid 144 between inner wall 128A and outer wall 128B may contain a dye or pigment that is initially trapped between inner wall 128A and outer wall 128B. If inner wall 128A becomes compromised, the dye or pigmented fluid 144 may seep through inner wall 128 and may pollute fluid 110. The appearance of this type of pollution in fluid 110 may indicate that a leak has occurred and that lens element 88 may need to be repaired or replaced.

If desired, lens element 88 may be tested during manufacturing to determine if any leaks are present. For example, lens element 88 may be compressed one or more times to observe whether bubbles appear in fluid 110, to observe whether a dye or pigment or other fluid 144 seeps into fluid 110, to measure whether a pressure change occurs between inner wall 128A and outer wall 128B, and/or to otherwise determine whether lens element 88 has any leaks.

If desired, one or more sensors such as sensor 146 may optionally be incorporated into lens element 88 to determine whether lens element 88 has a leak. Sensor 146 may be a pressure sensor (e.g., a sensor that measures the pressure of fluid 110 and/or fluid 144), a capacitive sensor, a resistive pressure sensor, a force sensor, and/or other suitable sensor. For example, sensor 146 may be a liquid pressure sensor that detects when an amount of fluid 110 in volume V changes, may be an air pressure sensor that detects when the air pressure between inner wall 128A and outer wall 128B changes, may be a strain gauge in inner wall 128A and/or outer wall 128B that detects changes in the force applied (e.g., by fluid 110 and/or fluid 144) on inner wall 128A and/or outer wall 128B, and/or may have any other suitable configuration. If desired, a coating or other material that changes properties (e.g., that changes color or otherwise changes appearance) when contacted by fluid 110 may be used outside of inner wall 128A to detect when fluid 110 escapes inner wall 128A. This type of coating or other material may be used in addition to or instead of sensor 146.

Figure 9:
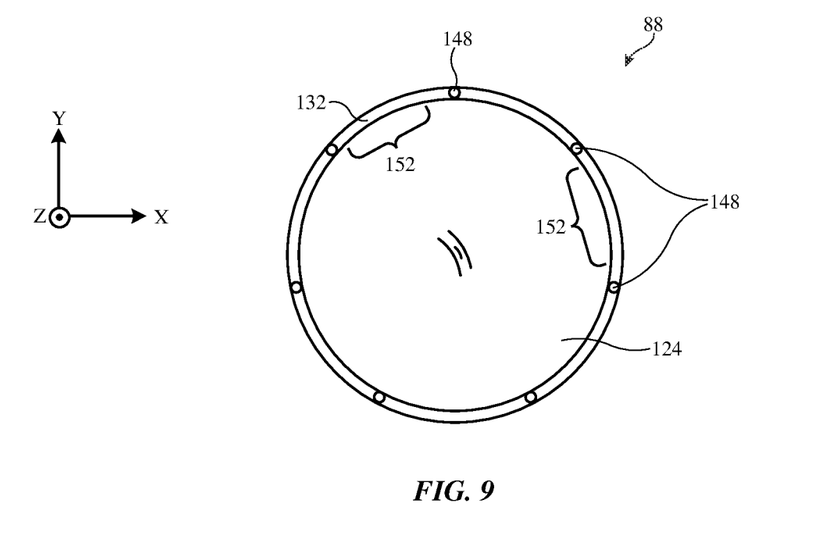
FIG. 9 is a top view of an illustrative adjustable lens element having a lens shaping component in accordance with an embodiment.

FIG. 9 is a top view of an illustrative lens element 88 having a lens shaper component 132. In the example of FIG. 9, lens shaper 132 is shown as having a round shape. This is, however, merely illustrative. If desired, lens shaper 132 may be circular, oval, elliptical, rectangular, or any other suitable shape. Lens shaper component 132 may have one or more actuators that apply forces at actuation points such as actuation points 148. At each actuation point 148, an actuator may be used to push, pull, or otherwise apply a force to lens shaper component 132 at location 148 to thereby adjust the shape of flexible membrane 124. There may be one, two, three, six, eight, ten, fifteen, less than fifteen, or more than fifteen actuation points 148, which may be distributed evenly or unevenly around the periphery of lens shaper component 132.

If desired, lens shaper component 132 may have a non-uniform construction to achieve a desired performance with respect to how lens shaper component 132 changes the lens power of lens element 88. For example, lens shaper component 132 may have non-uniform thickness (e.g., thickness in the Z-dimension and/or thickness in the X-Y plane), non-uniform materials, non-uniform modulus of elasticity, non-uniform shape, and/or other non-uniform properties. For example, the modulus of elasticity may gradually change along the circumference or perimeter of lens shaper component 132 (e.g., so that regions 152 between actuation points 148 are stiffer or less stiff than at actuation points 148). Different moduli of elasticity may be obtained by using different materials and/or by changing the geometry of component 132 in certain regions (e.g., by locally thinning certain regions or forming perforations in certain regions to reduce the modulus of elasticity in those regions). This is, however, merely illustrative. If desired, lens shaper component 132 may have a uniform construction.

The foregoing is merely illustrative and various modifications can be made to the described embodiments. The foregoing embodiments may be implemented individually or in any combination.

What is claimed is:

1. A system, comprising:
a head-mounted support structure;
a display that emits light;
a lens module supported by the head-mounted support structure that receives the light from the display, wherein the lens module comprises a fluid-filled lens element having a flexible membrane supported by a foldable sidewall and an outer flexible sidewall that surrounds the foldable sidewall; and
control circuitry configured to control the lens module to adjust a curvature of the flexible membrane, wherein the foldable sidewall and the outer flexible sidewall are configured to fold in response to forces applied to the flexible membrane.

2. The system defined in claim 1 wherein the fluid-filled lens element comprises a transparent substrate on which the foldable sidewall is formed.

3. The system defined in claim 2 wherein the transparent substrate comprises glass.

4. The system defined in claim 2 wherein the fluid-filled lens element comprises a lens shaping component that adjusts a height of the foldable sidewall relative to the transparent substrate to adjust the curvature of the flexible membrane.

5. The system defined in claim 4 further comprising a reinforcement ring in the foldable sidewall.

6. The system defined in claim 5 further comprising an additional reinforcement ring in the foldable sidewall, wherein the reinforcement ring and the additional reinforcement ring are laterally offset from one another and have different perimeter lengths.

7. The system defined in claim 5 wherein the reinforcement ring comprises metal.

8. The system defined in claim 1 further comprising a fluid interposed between the foldable sidewall and the outer flexible sidewall.

9. The system defined in claim 1 further comprising a sensor that detects leaks in the fluid-filled lens element, wherein the sensor is selected from the group consisting of: a pressure sensor, a capacitive sensor, a resistive sensor, and a force sensor.

10. An adjustable lens, comprising:
a transparent substrate;
a wall that forms a closed perimeter on the transparent substrate, wherein the wall comprises bellows, and wherein the wall comprises first and second reinforced regions that are strengthened relative to other regions of the wall, and wherein the first reinforced region has a first perimeter length and the second reinforced region has a second perimeter length that is greater than the first perimeter length;
a flexible membrane attached to the wall, wherein the transparent substrate, the wall, and the flexible membrane define an interior volume that contains a fluid; and
a lens shaping component that applies a force to the wall to adjust a height of the wall relative to the transparent substrate.

11. The adjustable lens defined in claim 10 wherein the transparent substrate comprises glass and wherein the wall comprises polymer.

12. The adjustable lens defined in claim 10 wherein the lens shaping component has a non-uniform modulus of elasticity.

13. The adjustable lens defined in claim 10 wherein the wall folds on itself when compressed by the lens shaping component.

14. The adjustable lens defined in claim 10 wherein the first and second reinforced regions are laterally offset from one another.

15. A system, comprising:
a head-mounted support structure;
a display that emits light;
an adjustable lens element supported by the head-mounted support structure that receives the light from the display, wherein the adjustable lens element comprises a flexible membrane that is supported by a collapsible sidewall and an outer sidewall, and wherein the adjustable lens element has a liquid located between the collapsible sidewall and the outer sidewall; and
control circuitry configured to control the adjustable lens element to adjust a shape of the flexible membrane.

16. The system defined in claim 15 wherein the adjustable lens element comprises a rigid substrate and wherein the rigid substrate, the flexible membrane, and the collapsible sidewall define an interior volume that is at least partially filled with a fluid.

17. The system defined in claim 16 wherein the collapsible sidewall has first and second curved portions that extend around a perimeter of the collapsible sidewall.

18. The system defined in claim 17 wherein the first and second curved portions face towards the fluid.

19. The system defined in claim 18 further comprising a reinforced ring portion interposed between the first and second curved portions.

20. The system defined in claim 16 further comprising a lens shaping component having actuators that adjust a height of the collapsible sidewall relative to the rigid substrate to adjust the shape of the flexible membrane.

\* \* \* \* \*